(12) United States Patent
Mine et al.

(10) Patent No.: US 10,153,067 B2
(45) Date of Patent: Dec. 11, 2018

(54) ELECTROCONDUCTIVE ELASTOMER COMPOSITION AND MANUFACTURING METHOD THEREFOR

(71) Applicant: SUMITOMO RUBBER INDUSTRIES, LTD., Kobe-shi, Hyogo (JP)

(72) Inventors: Akihiro Mine, Kobe (JP); Munehiro Nishimoto, Kobe (JP); Masashi Hamakubo, Kobe (JP); Masahiro Yoshizato, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/031,495

(22) PCT Filed: Sep. 26, 2014

(86) PCT No.: PCT/JP2014/075730
§ 371 (c)(1),
(2) Date: Apr. 22, 2016

(87) PCT Pub. No.: WO2015/072235
PCT Pub. Date: May 21, 2015

(65) Prior Publication Data
US 2016/0266524 A1    Sep. 15, 2016

(30) Foreign Application Priority Data
Nov. 18, 2013 (JP) .................................. 2013-238171

(51) Int. Cl.
*H01B 1/24* (2006.01)
*G03G 15/16* (2006.01)
(Continued)

(52) U.S. Cl.
CPC .................. *H01B 1/24* (2013.01); *C08J 3/20* (2013.01); *C08K 3/04* (2013.01); *C08K 5/0016* (2013.01);
(Continued)

(58) Field of Classification Search
None
See application file for complete search history.

(56) References Cited

U.S. PATENT DOCUMENTS

2004/0018328 A1  1/2004 Yamada et al.
2004/0135129 A1  7/2004 Hattori et al.
(Continued)

FOREIGN PATENT DOCUMENTS

CN    1906249 A    1/2007
CN    101051202 A   10/2007
(Continued)

OTHER PUBLICATIONS

Teknor Apex, "Thermoplastic Elastomers TPE, TPR" webpage, accessible online at http://www.bpf.co.uk/plastipedia/polymers/thermoplastic_elastomers.aspx ; Wayback Machine shows availability date is Oct. 18, 2011; PDF pp. 1-3.*
(Continued)

*Primary Examiner* — Katie L Hammer
(74) *Attorney, Agent, or Firm* — Birch, Stewart, Kolasch & Birch, LLP (57) ABSTRACT

There are provided: an electrically conductive thermoplastic elastomer composition which can be produced with higher productivity at lower costs by means of a simple arrangement and has excellent extrudability and a lower resistance required for a driving roller; a production method for the composition; a driving roller produced by employing the electrically conductive thermoplastic elastomer composition; and an image forming apparatus incorporating the
(Continued)

driving roller. In the electrically conductive thermoplastic elastomer composition, 5 to 15 parts by mass of Ketjen black is finely dispersed in 100 parts by mass of a mixture of an ester type urethane thermoplastic elastomer and a plasticizer or in 100 parts by mass of a polyester thermoplastic elastomer. In the production method, the ingredient other than the Ketjen black is first kneaded, and then the Ketjen black is added to and further kneaded with the ingredient. The driving roller (1) is formed of the electrically conductive thermoplastic elastomer composition. The image forming apparatus incorporates the driving roller.

3 Claims, 4 Drawing Sheets

(51) Int. Cl.
C08K 3/04 (2006.01)
C08K 5/10 (2006.01)
G03G 15/00 (2006.01)
C08L 75/04 (2006.01)
C08K 5/00 (2006.01)
C08K 5/103 (2006.01)
C08J 3/20 (2006.01)

(52) U.S. Cl.
CPC ............... *C08K 5/10* (2013.01); *C08K 5/103* (2013.01); *C08L 75/04* (2013.01); *G03G 15/00* (2013.01); *G03G 15/1615* (2013.01); *C08J 2367/00* (2013.01); *C08J 2375/04* (2013.01); *G03G 15/6529* (2013.01); *G03G 2215/00683* (2013.01)

(56) References Cited

U.S. PATENT DOCUMENTS

| | | | |
|---|---|---|---|
| 2005/0047833 A1 | 3/2005 | Fujiwara | |
| 2007/0029530 A1 | 2/2007 | Noda et al. | |
| 2007/0116958 A1* | 5/2007 | Suzuki | C08L 67/025 428/411.1 |
| 2008/0013985 A1* | 1/2008 | Yamakawa | G03G 15/0818 399/119 |
| 2011/0033205 A1* | 2/2011 | Suzuki | C08L 67/02 399/162 |
| 2011/0034308 A1 | 2/2011 | Tamura et al. | |
| 2011/0217653 A1* | 9/2011 | Izutani | G03G 13/20 430/124.1 |
| 2011/0318569 A1* | 12/2011 | Kobayashi | C08J 9/0066 428/317.3 |
| 2012/0189840 A1 | 7/2012 | Nishimoto | |
| 2013/0082215 A1* | 4/2013 | Esseghir | C08F 297/083 252/511 |

FOREIGN PATENT DOCUMENTS

| | | |
|---|---|---|
| JP | 7-11047 A | 1/1995 |
| JP | 2002-47410 A | 2/2002 |
| JP | 2003-48945 A | 2/2003 |
| JP | 2003-213143 A | 7/2003 |
| JP | 2003-214567 A | 7/2003 |
| JP | 2004-51828 A | 2/2004 |
| JP | 2004-100943 A | 4/2004 |
| JP | 2005-99763 A | 4/2005 |
| JP | 2005-234024 A | 9/2005 |
| JP | 2007-246922 A | 9/2007 |
| JP | 2007-293094 A | 11/2007 |
| JP | 2007-293095 A | 11/2007 |
| JP | 2008-214409 A | 9/2008 |
| JP | 2008-254845 A | 10/2008 |
| JP | 2009-122361 A | 6/2009 |
| JP | 2011-37563 A | 2/2011 |

OTHER PUBLICATIONS

Chinese Office Action and Search Report for Application No. 201480056375.8, dated Dec. 21, 2017, with an English translation.
Liu, "Handbook of Raw Materials and Additives for Polyurethanes," Ed. 1, 2005, p. 533 (3 pages total).
International Search Report, issued in PCT/JP2014/075730, dated Jan. 13, 2015.
Written Opinion of the International Searching Authority, issued in PCT/JP2014/075730, dated Jan. 13, 2015.
International Preliminary Report on Patentability and the English translation of the Written Opinion of the International Searching Authority (Forms PCT/IB/338, PCT/IB/373 and PCT/ISA/237), dated Jun. 2, 2016, for International Application No. PCT/JP2014/075730.
Chinese Office Action and Search Report for Chinese Application No. 201480056375.8, dated Aug. 27, 2018.

* cited by examiner

FIG. 5

ELECTROCONDUCTIVE ELASTOMER COMPOSITION AND MANUFACTURING METHOD THEREFOR

TECHNICAL FIELD

The present invention relates to an electrically conductive elastomer composition, and to a production method therefor. The present invention further relates to a driving roller produced by extruding the electrically conductive elastomer composition into a roller form, and to an image forming apparatus incorporating the driving roller.

BACKGROUND ART

In an electrophotographic image forming apparatus such as an electrostatic copying machine, a laser printer, a plain paper facsimile machine or a copier-printer-facsimile multifunction machine, a driving roller is employed for rotatively driving a sheet feed belt, a transfer belt, an intermediate transfer belt or the like.

The conventional driving roller is roughly classified into a crosslinked rubber type or a coating type.

For the driving roller of the former crosslinked rubber type, a crosslinkable rubber such as an EPDM is used as a base polymer, and a crosslinkable rubber composition is prepared by blending a plasticizer, a filler, a crosslinking agent, an electrically conductivity imparting agent and the like with the base polymer, and kneading the resulting mixture. Then, the driving roller is produced by extruding the crosslinkable rubber composition into a roller body and crosslinking the roller body.

The driving roller of the latter coating type is produced as having a thin coating layer having a thickness of not greater than about 0.3 mm by applying a coating agent containing a curable binder resin such as a urethane resin on an outer peripheral surface of a metal roller, and curing the binder resin.

The type of the driving roller to be selected is dependent upon required characteristic properties. The production of the driving roller of the former crosslinked rubber type problematically requires higher production costs with lower productivity, because the rubber kneading step and the crosslinking step are performed on a batch basis.

The production of the driving roller of the latter coating type also problematically requires higher production costs with lower productivity, because it is difficult to properly control the quality of the coating agent or to uniformly apply the coating agent on the outer peripheral surface of the roller. Further, the thin coating layer is liable to be worn out in a short period of time.

It is contemplated to use a thermoplastic elastomer composition containing a thermoplastic elastomer as a base polymer instead of the crosslinkable rubber composition for production of a sheet feed roller, a charging roller and a transfer roller to be incorporated, like the driving roller, in the image forming apparatus (see PTL1 and PTL2).

For the sheet feed roller and the like to be produced from the thermoplastic elastomer composition, for example, the thermoplastic elastomer composition is continuously prepared with the use of an extruder. Without the need for the batch-based rubber kneading step and the batch-based crosslinking step subsequent to the extruding step, the production of these rollers can be achieved with improved productivity at lower costs. Where the driving roller is produced from the thermoplastic elastomer composition in the same manner as the sheet feed roller and the like, therefore, it is expected to provide the same effects.

CITATION LIST

Patent Literature

PTL1: JP2011-37563A
PTL2: JP2008-254845A
PTL3: JP2004-51828A

SUMMARY OF INVENTION

Technical Problem

Where the driving roller is incorporated in associated with a transfer belt, an intermediate transfer belt or the like for use, for example, the driving roller is required to be electrically conductive. In addition, the driving roller is required to have a lower resistance and a higher electrical conductivity. Particularly, the driving roller preferably has a roller resistance of not greater than $10^5 \Omega$ level.

It is conceivable to blend: (A) an ion conductive agent such as an electrically conductive polymer; or (B) an electrically conductive carbon black such as Ketjen black in the thermoplastic elastomer composition in order to impart the driving roller produced from the thermoplastic elastomer composition with electrical conductivity.

With the use of the former ion conductive agent, however, it is difficult to reduce the resistance of the driving roller to a predetermined required resistance range. In addition, the ion conductive agent is more expensive than the electrically conductive carbon black and the like, thereby increasing the production costs of the driving roller.

On the other hand, the latter electrically conductive carbon black has poorer dispersibility, making it difficult to reduce the resistance of the driving roller to the predetermined resistance range.

Particularly, where the electrically conductive carbon black is dry-blended with the thermoplastic elastomer and other ingredients and then the resulting mixture is kneaded as in the ordinary production process, it is difficult to homogeneously disperse the whole amount of the electrically conductive carbon black necessary to reduce the resistance of the driving roller to the predetermined resistance range. Therefore, the electrically conductive carbon black is liable to be flocculated.

If the electrically conductive carbon black is flocculated to be unevenly dispersed, the overall resistance of the driving roller is adversely increased.

Further, a thermoplastic elastomer composition containing a great amount of the electrically conductive carbon black is liable to have a reduced formability (extrudability) particularly when being extruded into the roller body.

Therefore, it is necessary to reduce the extrusion line speed in order to stably extrude the thermoplastic elastomer composition into a roller body having predetermined dimensions for prevention of forming defects such as surface roughening. This problematically reduces the productivity of the driving roller to increase the production costs.

If the amount of the electrically conductive carbon black is reduced to smaller than the necessary amount, the electrically conductive carbon black can be entirely homogeneously dispersed in the thermoplastic elastomer composition, thereby improving the extrudability. In this case, however, the resistance of the driving roller cannot be reduced to the predetermined resistance range.

In PTL3, it is contemplated to reduce the resistance of the driving roller by using the ion conductive agent as a main electrically conductive agent and a small amount of the electrically conductive carbon black as an auxiliary electrically conductive agent, but this arrangement provides a limited effect.

In order to homogeneously disperse the electrically conductive carbon black as described above, the amount of the electrically conductive carbon black should be limited to a small amount on the order of not greater than 2.3 mass % based on the overall amount of the thermoplastic elastomer composition as described in Examples in PTL3.

In Examples in PTL3, therefore, the resistance of the driving roller cannot be sufficiently reduced even with the combinational use of the electrically conductive carbon black and the ion conductive agent, but the driving roller has a roller resistance on the order of $10^6 \Omega$ level.

In Examples in PTL3, the expensive ion conductive agent is used in combination with the electrically conductive carbon black. In addition, a special thermoplastic elastomer prepared by dynamically crosslinking a crosslinkable rubber in a thermoplastic elastomer and/or a thermoplastic resin is used as the base polymer. Therefore, the production costs are problematically increased.

Further, the special thermoplastic elastomer has lower extrudability. Particularly, where the electrically conductive carbon black is blended in an amount greater than the aforementioned range as described above, the extrudability is further reduced, making it impossible to extrude the thermoplastic elastomer composition into a neat roller body free from forming defects such as surface roughening. This is apparent from the results for Comparative Example 3 in PTL3.

Further, the step of preparing the thermoplastic elastomer by the dynamic crosslinking is additionally required. This correspondingly reduces the productivity of the thermoplastic elastomer composition and hence the productivity of the driving roller.

It is an object of the present invention to provide a novel electrically conductive thermoplastic elastomer composition which can be produced with higher productivity at lower costs by means of a simple arrangement and has excellent extrudability and a lower resistance required for a driving roller, and to provide an efficient production method for the electrically conductive thermoplastic elastomer composition.

It is another object of the present invention to provide a driving roller produced by employing the electrically conductive thermoplastic elastomer composition, and to provide an image forming apparatus incorporating the driving roller.

Solution to Problem

According to the present invention, there is provided an electrically conductive thermoplastic elastomer composition, which essentially comprises: an ester type urethane thermoplastic elastomer; a plasticizer; and Ketjen black finely dispersed in a mixture of the ester type urethane thermoplastic elastomer and the plasticizer, the Ketjen black being present in an amount of not less than 5 parts by mass and not greater than 15 parts by mass based on 100 parts by mass of the mixture of the ester type urethane thermoplastic elastomer and the plasticizer.

According to the present invention, there is also provided an electrically conductive thermoplastic elastomer composition, which essentially comprises: a polyester thermoplastic elastomer; and Ketjen black finely dispersed in the polyester thermoplastic elastomer, the Ketjen black being present in an amount of not less than 5 parts by mass and not greater than 15 parts by mass based on 100 parts by mass of the polyester thermoplastic elastomer.

According to the present invention, there is also provided a driving roller, which is formed of either of the inventive electrically conductive thermoplastic elastomer compositions and has a Durometer Type-A hardness of not lower than 60 degrees and not higher than 80 degrees.

According to the present invention, there is also provided an image forming apparatus which includes the inventive driving roller.

The electrically conductive thermoplastic elastomer compositions according to the present invention each employ the Ketjen black which is particularly excellent in electrical conductivity among other electrically conductive carbon blacks. Since the predetermined amount of the Ketjen black is homogeneously finely dispersed in the electrically conductive thermoplastic elastomer composition, the electrically conductive thermoplastic elastomer composition has a lower resistance (particularly, not greater than $10^5 \Omega$ level) required for the driving roller.

As described above, the Ketjen black is homogeneously finely dispersed in the electrically conductive thermoplastic elastomer composition. In addition, the ester type urethane thermoplastic elastomer is used as the base polymer, and the plasticizer is added to the ester type urethane thermoplastic elastomer to improve the extrudability. Alternatively, the polyester thermoplastic elastomer intrinsically excellent in extrudability is selected. Thus, the electrically conductive thermoplastic elastomer compositions are each imparted with improved extrudability, even if the Ketjen black is added in the amount necessary to impart the composition with a lower resistance required for the driving roller.

The electrically conductive thermoplastic elastomer compositions according to the present invention obviate the need for the batch-based crosslinking step, thereby permitting efficient production of the inventive driving roller with higher productivity.

In addition, the electrically conductive thermoplastic elastomer compositions according to the present invention each have a simple formulation which essentially contains three or two components and, therefore, can be produced with higher productivity at lower costs without the need for the rubber kneading step and the dynamic crosslinking step.

The term "essentially" herein means that the present invention embraces not only the electrically conductive thermoplastic elastomer compositions containing the ester type urethane thermoplastic elastomer or the polyester thermoplastic elastomer as the base polymer for the driving roller, the Ketjen black for imparting the base polymer with electrical conductivity, and the plasticizer for improving the extrudability of the ester type urethane thermoplastic elastomer, but also electrically conductive thermoplastic elastomer compositions further containing various ingredients for imparting the electrically conductive thermoplastic elastomer compositions with auxiliary functions other than the aforementioned function.

In the electrically conductive thermoplastic elastomer compositions according to the present invention, the amount of the Ketjen black is limited to a range of not less than 5 parts by mass and not greater than 15 parts by mass based on 100 parts by mass of the mixture of the ester type urethane thermoplastic elastomer and the plasticizer or based on 100 parts by mass of the polyester thermoplastic elastomer for the following reasons.

If the amount of the Ketjen black is less than the aforementioned range, it will be impossible to impart the electrically conductive thermoplastic elastomer composition with proper electrical conductivity even with the addition of the Ketjen black having excellent electrical conductivity, failing to sufficiently reduce the resistance of the driving roller to a resistance range suitable for the driving roller.

If the amount of the Ketjen black is greater than the aforementioned range, the driving roller is liable to have a higher hardness and hence have a reduced frictional force with respect to a belt, suffering from slippage or the like.

The Durometer Type-A hardness of the driving roller according to the present invention is limited to a range of not lower than 60 degrees and not higher than 80 degrees as measured in conformity with Japanese Industrial Standards JIS K6253-3:2012 "Rubber, vulcanized or thermoplastic—Determination of hardness—Part 3: Durometer method" for the following reasons. If the hardness is lower than the aforementioned range, the driving roller is liable to have insufficient abrasion resistance. If the hardness is higher than the aforementioned range, the driving roller is liable to have a reduced frictional force with respect to the belt, suffering from slippage or the like.

According to the present invention, there is also provided a method for producing an electrically conductive elastomer composition by means of a twin screw kneading extruder including a kneading portion which kneads a material and extrudes the material in one direction, a main feeder which feeds an ingredient into the kneading portion, and aside feeder which feeds an ingredient into the kneading portion at a position downstream of the main feeder with respect to the material extruding direction, the method including the steps of: feeding an ingredient other than Ketjen black into the kneading portion from the main feeder and kneading the fed ingredient; and feeding the Ketjen black into the kneading portion from the side feeder and further kneading the Ketjen black with the previously fed ingredient to finely disperse the Ketjen black in the ingredient.

In the present invention, the electrically conductive thermoplastic elastomer composition is produced through a two-step process by first sufficiently kneading the ingredient other than the Ketjen black in the kneading portion of the twin screw kneading extruder, then adding the Ketjen black to the ingredient, and further kneading the Ketjen black with the ingredient. This makes it possible to continuously efficiently produce the inventive electrically conductive thermoplastic elastomer composition by finely dispersing the Ketjen black in the ingredient while preventing the destruction of the structure of the Ketjen black and the flocculation of the Ketjen black.

The ester type urethane thermoplastic elastomer to be used in combination with the plasticizer preferably has a Durometer Type-A hardness of not lower than 60 degrees and not higher than 80 degrees.

If the hardness is lower than the aforementioned range, the driving roller is liable to have insufficient abrasion resistance. If the hardness is higher than the aforementioned range, the driving roller is liable to have a reduced frictional force with respect to the belt, suffering from slippage or the like.

The ester type urethane thermoplastic elastomer E and the plasticizer P to be used in combination are preferably blended in a mass ratio E/P of E/P=55/45 to 85/15.

If the ratio E of the ester type urethane thermoplastic elastomer is less than the aforementioned range, the driving roller is liable to have insufficient abrasion resistance. If the ratio P of the plasticizer is less than the aforementioned range, the electrically conductive thermoplastic elastomer composition is liable to have lower extrudability, and the driving roller is liable to have a reduced frictional force with respect to the belt, suffering from slippage or the like.

The polyester thermoplastic elastomer also preferably has a Durometer Type-A hardness of not less than 60 degrees and not greater than 80 degrees, like the ester type urethane thermoplastic elastomer.

If the hardness is lower than the aforementioned range, the driving roller is liable to have insufficient abrasion resistance. If the hardness is higher than the aforementioned range, the driving roller is liable to be excessively hard and hence have a reduced frictional force with respect to the belt, suffering from slippage or the like.

Advantageous Effects of Invention

The present invention provides the novel electrically conductive thermoplastic elastomer compositions which each have excellent extrudability and a lower resistance required for a driving roller and can be produced with higher productivity at lower costs by means of a simplified arrangement, and the efficient production method for the electrically conductive thermoplastic elastomer compositions. The present invention also provides the driving roller produced by employing the electrically conductive thermoplastic elastomer composition, and the image forming apparatus incorporating the driving roller.

DESCRIPTION OF EMBODIMENTS

<<Electrically Conductive Thermoplastic Elastomer Compositions>>

An electrically conductive thermoplastic elastomer composition according to the present invention essentially contains: an ester type urethane thermoplastic elastomer; a plasticizer; and Ketjen black finely dispersed in a mixture of the ester type urethane thermoplastic elastomer and the plasticizer, the Ketjen black being present in an amount of not less than 5 parts by mass and not greater than 15 parts by mass based on 100 parts by mass of the mixture of the ester type urethane thermoplastic elastomer and the plasticizer.

Another electrically conductive thermoplastic elastomer composition according to the present invention essentially contains: a polyester thermoplastic elastomer; and Ketjen black finely dispersed in the polyester thermoplastic elastomer, the Ketjen black being present in an amount of not less than 5 parts by mass and not greater than 15 parts by mass based on 100 parts by mass of the polyester thermoplastic elastomer.

<Ester Type Urethane Thermoplastic Elastomer>

Usable as the ester type urethane thermoplastic elastomer are various ester type urethane thermoplastic elastomers which each contain a hard segment having a polyurethane structure and a soft segment having a polyester structure in a molecule thereof, and have thermoplasticity that permits injection molding and elasticity that permits a driving roller to properly function.

Particularly, the ester type urethane thermoplastic elastomer preferably has a Durometer Type-A hardness of not lower than 60 degrees and not higher than 80 degrees as measured in conformity with Japanese Industrial Standards JIS K6253-3:2012 "Rubber, vulcanized or thermoplastic—Determination of hardness—Part 3: Durometer method."

If the hardness is lower than the aforementioned range, the driving roller is liable to have insufficient abrasion resistance. If the hardness is higher than the aforementioned range, the driving roller is liable to have a reduced frictional force with respect to a belt, suffering from slippage or the like.

Specific examples of the ester type urethane thermoplastic elastomer include ELASTORAN (registered trade name) series C80A (having a Durometer Type-A hardness of 80±2 degrees), S80A (having a Durometer Type-A hardness of 80±2 degrees), C60A10WN (having a Durometer Type-A hardness of 65±4 degrees and containing a plasticizer), C70A (having a Durometer Type-A hardness of 70±2 degrees), C70A10WN (having a Durometer Type-A hardness of 73±4 degrees and containing a plasticizer) and C70A11FG (having a Durometer Type-A hardness of 75±3 degrees) available from BASF Japan Co., Ltd., and MIRACTORAN (registered trade name) series E670 (having a Durometer Type-A hardness of 70±2 degrees) available from Nippon Miractoran Co., Ltd. These ester type urethane thermoplastic elastomers may be used alone or in combination.

The ester type urethane thermoplastic elastomers described above may each have a Durometer Type-A hardness having an upper limit and/or a lower limit falling outside the range of not less than 60 degrees and not greater than 80 degrees, as long as the median of the Durometer Type-A hardness falls within this range.

The ester type urethane thermoplastic elastomers without the note "containing a plasticizer" are supplied in a plasticizer-free state. On the other hand, the ester type urethane thermoplastic elastomers with the note "containing a plasticizer" are supplied in a plasticizer-containing state and, like the plasticizer-free ester type urethane thermoplastic elastomers, each provide an electrically conductive thermoplastic elastomer composition imparted with excellent extrudability by additionally blending the plasticizer in a mass ratio to be described later.

<Plasticizer>

Examples of the plasticizer include SANFLEX (registered trade name) series EB-200, EB-300 and EB-400 (polyethylene glycol dibenzoates) available from Sanyo Chemical Industries Ltd., BENZOFLEX (registered trade name) 9-88 (dipropylene glycol dibenzoate) available from Eastman Chemical Co., Ltd., bis(2-methoxyethyl) phthalate (DMEP) and tributoxyethyl phosphate (TBP), which may be used alone or in combination.

<Mass Ratio>

The mass ratio E/P of the ester type urethane thermoplastic elastomer E and the plasticizer P is preferably E/P=55/45 to 85/15, particularly preferably E/P=70/30 to 85/15.

If the ratio E of the ester type urethane thermoplastic elastomer is less than the aforementioned range, the driving roller is liable to have insufficient abrasion resistance. If the ratio P of the plasticizer is less than the aforementioned range, the electrically conductive thermoplastic elastomer composition is liable to have lower extrudability, and the driving roller is liable to have a reduced frictional force with respect to the belt, suffering from slippage or the like.

Where the ester type urethane thermoplastic elastomer preliminarily contains the plasticizer as described above, the amount of the plasticizer to be additionally blended is determined so that the mass ratio E/P between the solid content E of the ester type urethane thermoplastic elastomer (i.e., the amount E of the ester type urethane thermoplastic elastomer per se) and the total amount P of the plasticizer contained in the ester type urethane thermoplastic elastomer and the plasticizer to be additionally blended falls within the aforementioned range.

<Polyester Thermoplastic Elastomer>

Examples of the polyester thermoplastic elastomer include various polyester thermoplastic elastomers such as multi-block polymers each containing a hard segment of an aromatic polyester (polybutylene terephthalate or the like) having a higher melting point and a higher crystallinity and a soft segment of an amorphous polyether (polytetramethylene ether glycol or the like) having a glass transition temperature of not higher than about −70° C. These polyester thermoplastic elastomers may be used alone or in combination.

Particularly, the polyester thermoplastic elastomer preferably has a Durometer Type-A hardness of not lower than 60 degrees and not higher than 80 degrees as measured in conformity with the aforementioned JIS K6253-3:2012.

If the hardness is lower than the aforementioned range, the driving roller is liable to have insufficient abrasion resistance. If the hardness is higher than the aforementioned range, the driving roller is liable to have a reduced frictional force with respect to the belt, suffering from slippage or the like.

Specific examples of the polyester thermoplastic elastomer include HYTREL (registered trade name) series 3046 (having a Durometer Type-A hardness of 77 degrees), 3078 (having a Durometer Type-A hardness of 78 degrees), G3548L (having a Durometer Type-A hardness of 80 degrees), SB654 (having a Durometer Type-A hardness of 65 degrees), SB704 (having a Durometer Type-A hardness of 70 degrees), SB754 (having a Durometer Type-A hardness of 75 degrees) and SC753 (having a Durometer Type-A hardness of 75 degrees) available from Toray Du Pont Co., Ltd., and PELPRENE (registered trade name) series P30B (having a Durometer Type-A hardness of 71 degrees) available from Toyobo Co., Ltd. These polyester thermoplastic elastomers may be used alone or in combination.

<Ketjen Black>

Usable as the Ketjen black are Ketjen blacks of various grades each including hollow shell particles and having a higher electrical conductivity.

Specific examples of the Ketjen black include KETJEN BLACK EC300J (granular form), KETJEN BLACK EC600JD (granular form), CARBON ECP (powder obtained from KETJEN BLACK EC300J) and CARBON ECP600JD (powder obtained from KETJEN BLACK EC600JD) available from Lion Corporation. These Ketjen blacks may be used alone or in combination.

The amount of the Ketjen black should be not less than 5 parts by mass and not greater than 15 parts by mass based on 100 parts by mass of the mixture of the ester type urethane thermoplastic elastomer and the plasticizer or based on 100 parts by mass of the polyester thermoplastic elastomer.

If the amount of the Ketjen black is less than the aforementioned range, it will be impossible to impart the electrically conductive thermoplastic elastomer composition with proper electrical conductivity even with the addition of the Ketjen black having excellent electrical conductivity, failing to sufficiently reduce the resistance of the driving roller to a resistance range suitable for the driving roller.

If the amount of the Ketjen black is greater than the aforementioned range, on the other hand, the driving roller is liable to have a higher hardness and hence have a reduced frictional force with respect to the belt, suffering from slippage or the like.

In consideration of the balance between the frictional force and the resistance of the driving roller, the amount of the Ketjen black is preferably not greater than 12 parts by mass within the aforementioned range.

<Other Ingredients>

As described above, the inventive electrically conductive thermoplastic elastomer composition preferably contains only the ester type urethane thermoplastic elastomer or the polyester thermoplastic elastomer as the base polymer for the driving roller, the Ketjen black for imparting the base polymer with electrical conductivity, and the plasticizer for improving the extrudability of the ester type urethane thermoplastic elastomer.

In the present invention, however, other ingredients for imparting the electrically conductive thermoplastic elastomer composition with auxiliary functions other than the aforementioned function may be blended in the electrically conductive thermoplastic elastomer composition.

<<Production Method for Electrically Conductive Thermoplastic Elastomer Composition>>

In the inventive production method, a twin screw kneading extruder is used, which includes a kneading portion which kneads a material and extrudes the material in one direction, a main feeder which feeds an ingredient to the kneading portion, and aside feeder which feeds an ingredient to the kneading portion at a position downstream of the main feeder with respect to the material extruding direction.

With the kneading portion being operated, the aforementioned ingredients other than the Ketjen black are preliminarily dry-blended, and fed into the kneading portion from the main feeder. While the ingredients are fed in the extruding direction and kneaded in the kneading portion, the Ketjen black is fed into the kneading portion from the side feeder and further kneaded with the previously kneaded ingredients.

Through this two-step process, the inventive electrically conductive thermoplastic elastomer composition can be continuously efficiently produced by finely dispersing the Ketjen black in the ingredients while preventing the destruction of the structure of the Ketjen black and the flocculation of the Ketjen black.

The electrically conductive thermoplastic elastomer composition thus produced is continuously extruded from a distal end of the kneading portion, and the resulting strand is continuously cooled, for example, through a strand cooling section and continuously pelletized by a pelletizer.

<<Driving Roller>>

Figure 1:
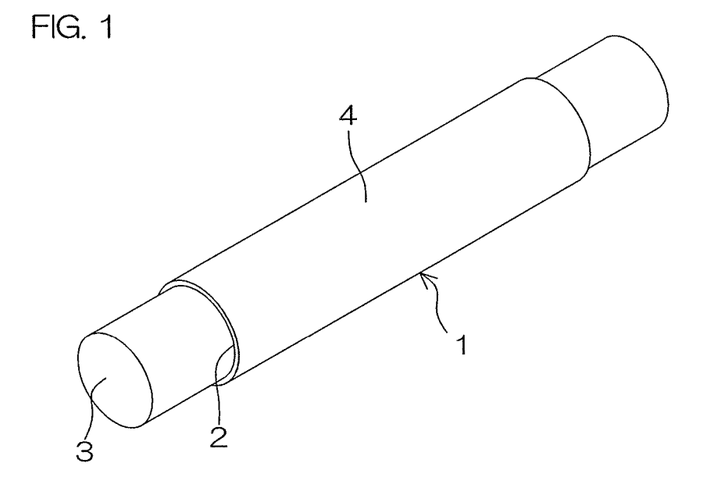
FIG. 1 is a perspective view showing the appearance of an exemplary driving roller according to one embodiment of the present invention.

FIG. 1 is a perspective view showing the appearance of an exemplary driving roller according to an embodiment of the present invention.

Referring to FIG. 1, the driving roller 1 according to this embodiment includes a tubular body formed of the inventive electrically conductive thermoplastic elastomer composition and having a single layer structure, and a shaft 3 is inserted through and fixed to a center through-hole 2 of the tubular body.

The driving roller 1 may be porous, but is preferably nonporous for improvement of durability and the like.

The shaft 3 is a unitary member made of a metal such as aluminum, an aluminum alloy or a stainless steel.

The shaft 3 is electrically connected to and mechanically fixed to the driving roller 1, for example, via an electrically conductive adhesive agent. Alternatively, a shaft having an outer diameter that is greater than the inner diameter of the through-hole 2 is used as the shaft 3, and press-inserted into the through-hole 2 to be electrically connected to and mechanically fixed to the driving roller 1. Thus, the shaft 3 and the driving roller 1 are unitarily rotatable.

For production of the driving roller 1, the inventive electrically conductive thermoplastic elastomer composition is extruded into a tubular body by means of an extruder, and the tubular body is cooled and cut to a predetermined length. As required, the tubular body is polished to a predetermined outer diameter.

The shaft 3 may be inserted into and fixed to the through-hole 2 at any time between the end of the cutting of the tubular body and the end of the polishing.

However, the tubular body is preferably polished with the shaft 3 inserted through the through-hole 2 after the cutting. Further, the tubular body may be polished while being rotated about the shaft 3. This improves the working efficiency in the polishing, and suppresses deflection of an outer peripheral surface 4 of the driving roller 1.

As described above, the shaft 3 having an outer diameter that is greater than the inner diameter of the through-hole 2 is press-inserted through the through-hole 2. Alternatively, the shaft 3 may be inserted through the through-hole 2 with the intervention of the electrically conductive adhesive agent.

In the former case, the electrical connection and the mechanical fixing are achieved simultaneously with the press insertion.

The Durometer Type-A hardness of the driving roller 1 is limited to a range of not lower than 60 degrees and not higher than 80 degrees.

If the hardness is lower than the aforementioned range, the driving roller is liable to have insufficient abrasion resistance. If the hardness is higher than the aforementioned range, the driving roller is liable to have a reduced frictional force with respect to the belt, suffering from slippage or the like.

<Measurement of Roller Resistance>

Figure 2:
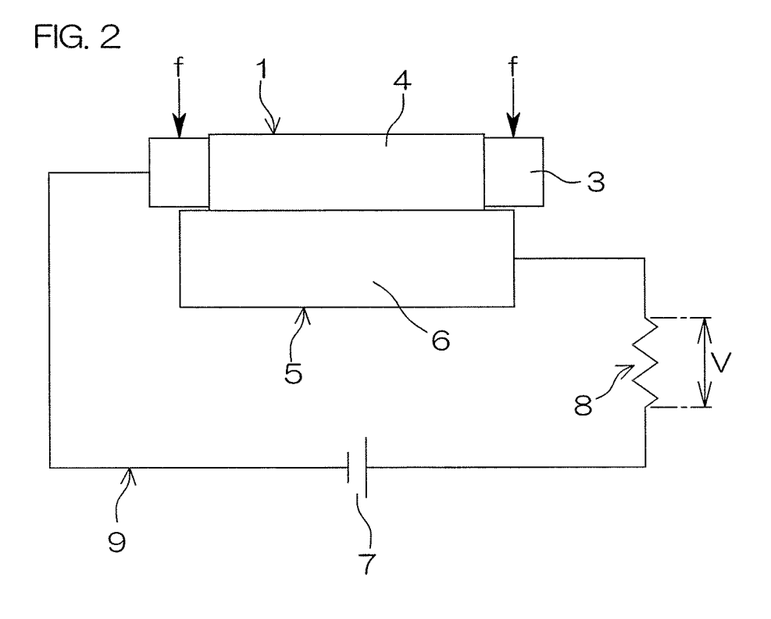
FIG. 2 is a diagram for explaining a method of measuring the roller resistance of the driving roller.

FIG. 2 is a diagram for explaining how to measure the roller resistance of the driving roller 1.

Referring to FIGS. 1 and 2, the roller resistance of the driving roller 1 is measured in the following manner.

An aluminum drum 5 rotatable at a constant rotation speed is prepared, and the outer peripheral surface 4 of the driving roller 1 to be subjected to the measurement of the roller resistance is brought into contact with an outer peripheral surface 6 of the aluminum drum 5 from above.

A DC power source 7 and a resistor 8 are connected in series between the shaft 3 of the driving roller 1 and the aluminum drum 5 to provide a measurement circuit 9. The DC power source 7 is connected to the shaft 3 at its negative terminal, and connected to the resistor 8 at its positive terminal. The resistor 8 has a resistance r of 100Ω.

Subsequently, a load F of 450 gf (=4.41 N) is applied to each of opposite end portions of the shaft 3 to bring the driving roller 1 into press contact with the aluminum drum 5 and, in this state, a detection voltage V applied to the resistor 8 is measured by applying an application voltage E of DC 50 V from the DC power source 7 between the shaft 3 and the aluminum drum 5 while rotating the aluminum drum 5 (at a rotation speed of 40 rpm).

The roller resistance R of the driving roller 1 is basically determined from the following expression (1') based on the detection voltage V and the application voltage E (=50 V):

$$R = r \times E/(V-r) \tag{1'}$$

However, the term −r in the denominator of the expression (1') is negligible, so that the roller resistance of the driving roller 1 is expressed by a value determined from the following expression (1) in the present invention:

$$R = r \times E/V \tag{1}$$

The measurement is performed in an ordinary temperature and ordinary humidity environment at a temperature of 23±1° C. at a relative humidity of 55±1%.

<Measurement of Frictional Force>

Figure 3:
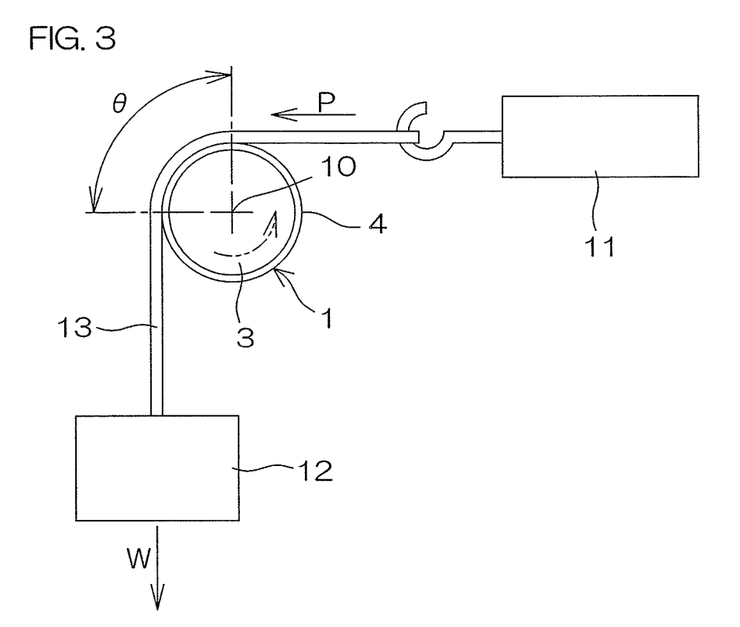
FIG. 3 is a schematic diagram for explaining an apparatus to be used for measuring the frictional force of the driving roller with respect to a belt.

FIG. 3 is a schematic diagram for explaining an apparatus to be used for measuring the friction coefficient μ of the driving roller with respect to a belt.

Referring to FIG. 3, the frictional force of the driving roller 1 is determined based on a friction coefficient μ measured by a measurement method in conformity with the Oiler belt system by means of the above apparatus.

First, the driving roller 1 is held so as to be rotatable in a direction indicated by a two-dot-and-dash line in FIG. 3 with a center axis 10 of the shaft 3 kept horizontal. Further, a load meter 11 is provided near the driving roller 1 as spaced a predetermined distance from the center axis 10 of the driving roller 1.

Then, a belt 13 is brought into contact with a portion of the outer peripheral surface 4 of the driving roller 1 defined by a center angle θ (degree) about the center axis 10 with a weight 12 attached to one of opposite ends thereof and suspended below the driving roller 1 and with the other end thereof connected to the load meter 11.

Subsequently, a load P (N) occurring when the driving roller 1 is rotated at a predetermined speed in the direction indicated by the two-dot-and-dash line is measured by means of the load meter 11, and the friction coefficient μ is calculated based on the measured load P (N), the load W (N) of the weight 12 and the center angle θ (degree) from the following expression (2):

$$\mu = (1/\theta)\ln(P/W) \tag{2}$$

Then, the frictional force F (N) is determined based on the measured load P (N) and the friction coefficient (μ) from the following expression (3):

$$F(N) = \mu \times P \tag{3}$$

The measurement is performed in the ordinary temperature and ordinary humidity environment at a temperature of 23±1° C. at a relative humidity of 55±1%.

<<Image Forming Apparatus>>

An image forming apparatus according to the present invention is characterized in that the inventive driving roller 1 is incorporated, for example, in association with a sheet feed belt, a transfer belt, an intermediate transfer belt or the like.

Examples of the inventive image forming apparatus include electrophotographic image forming apparatuses such as a laser printer, an electrostatic copying machine, a plain paper facsimile machine and a printer-copier-facsimile multifunction machine.

EXAMPLES

Example 1

(Production of Electrically Conductive Thermoplastic Elastomer Composition)

With the use of a tumbler, 80 parts by mass of an ester type urethane thermoplastic elastomer (ELASTORAN C70A having a Durometer Type-A hardness of 70 degrees and available from BASF Japan Co., Ltd.) and 20 parts by mass of dipropylene glycol dibenzoate (BENZOFLEX 9-88 available from Eastman Chemical Co., Ltd.) as a plasticizer were dry-blended.

The mass ratio E/P of the ester type urethane thermoplastic elastomer E and the plasticizer P was 80/20.

A twin screw kneading extruder (HTM-38 available from Aibeck Co., Ltd.) including a kneading portion which kneads a material and extrudes the material in one direction, a main feeder which feeds an ingredient to the kneading portion, and a side feeder which feeds an ingredient to the kneading portion at a position downstream of the main feeder with respect to the material extruding direction was prepared. A mixture obtained by the dry blending was fed into the kneading portion of the twin screw kneading extruder from the main feeder.

While the mixture was fed in the extruding direction and kneaded in the kneading portion, Ketjen black (EC600JD available from Lion Corporation) was fed into the kneading portion from the side feeder and further kneaded with the previously kneaded mixture. Thus, an electrically conductive thermoplastic elastomer composition was produced.

The amount of the Ketjen black was 5 parts by mass based on 100 parts by mass of the mixture of the ester type urethane thermoplastic elastomer and the plasticizer.

The electrically conductive thermoplastic elastomer composition thus produced was continuously extruded from a distal end of the kneading portion, and the resulting strand was continuously cooled through a strand cooling section and continuously pelletized by a pelletizer.

(Production of Driving Roller 1)

The resulting pellets were fed into a ϕ50 short axis extruder (available from Kasamatsukako Laboratory Co., Ltd.), and the resulting melt was extruded into a tubular body having an inner diameter of 19 mm and a wall thickness of 1.0 mm. Then, the tubular body was cut to a predetermined length, and an aluminum shaft 3 having an outer diameter of 20 mm was press-inserted into a through-hole 2 of the tubular body. In turn, an outer peripheral surface 4 of the tubular body was polished to a wall thickness of 0.5 mm. Thus, a driving roller 1 with the shaft 3 electrically connected and mechanically fixed thereto as shown in FIG. 1 was produced.

Examples 2 and 3 and Comparative Examples 1 and 2

Electrically conductive thermoplastic elastomer compositions were produced in substantially the same manner as in Example 1, except that the amount of the Ketjen black was 3 parts by mass (Comparative Example 1), 7 parts by mass (Example 2), 15 parts by mass (Example 3) and 20 parts by mass (Comparative Example 2) based on 100 parts by mass of the mixture of the ester type urethane thermoplastic elastomer and the plasticizer. Then, driving rollers 1 each having the same configuration and the same dimensions as in Example 1 were produced in the same manner as in Example 1 by using the electrically conductive thermoplastic elastomer compositions thus produced.

The mass ratio E/P of the ester type urethane thermoplastic elastomer E and the plasticizer P was 80/20.

Comparative Example 3

An electrically conductive thermoplastic elastomer composition was produced in substantially the same manner as in Example 1, except that the Ketjen black was dry-blended with the ester type urethane thermoplastic elastomer and the plasticizer with the use of the tumbler in a single step, and the resulting mixture was fed into the kneading portion from the main feeder without the use of the second feeder and further kneaded. Then, a driving roller 1 having the same configuration and the same dimensions as in Example 1 was produced in the same manner as in Example 1 by using the electrically conductive thermoplastic elastomer composition thus produced.

The mass ratio E/P of the ester type urethane thermoplastic elastomer E and the plasticizer P was 80/20. The amount of the Ketjen black was 12 parts by mass based on 100 parts by mass of the mixture of the ester type urethane thermoplastic elastomer and the plasticizer.

Example 4

An electrically conductive thermoplastic elastomer composition was produced in substantially the same manner as in Example 1, except that a polyester thermoplastic elastomer (HYTREL 3046 having a Durometer Type-A hardness of 77 degrees and available from Toray Du Pont Co., Ltd.) was used instead of the ester type urethane thermoplastic elastomer and the plasticizer. Then, a driving roller 1 having the same configuration and the same dimensions as in Example 1 was produced in the same manner as in Example 1 by using the electrically conductive thermoplastic elastomer composition thus produced.

The amount of the Ketjen black was 7 parts by mass based on 100 parts by mass of the polyester thermoplastic elastomer.

Comparative Example 4

An electrically conductive thermoplastic elastomer composition was produced in substantially the same manner as in Example 1, except that a polyester thermoplastic elastomer (HYTREL 4047 having a Durometer Type-A hardness of 88 degrees and available from Toray Du Pont Co., Ltd.) was used instead of the ester type urethane thermoplastic elastomer and the plasticizer. Then, a driving roller 1 having the same configuration and the same dimensions as in Example 1 was produced in the same manner as in Example 1 by using the electrically conductive thermoplastic elastomer composition thus produced.

The amount of the Ketjen black was 7 parts by mass based on 100 parts by mass of the polyester thermoplastic elastomer.

<Measurement of Hardness>

The Durometer Type-A hardness of each of the driving rollers 1 produced in Examples and Comparative Examples was measured in conformity with Japanese Industrial Standards JIS K6253-3:2012 "Rubber, vulcanized or thermoplastic—Determination of hardness—Part 3: Durometer method" in an ordinary temperature and ordinary humidity environment at a temperature of 23±1° C. at a relative humidity of 55±1%.

A driving roller having a Durometer Type-A hardness of not lower than 60 degrees and not higher than 80 degrees was rated as acceptable (○), and a driving roller having a Durometer Type-A hardness falling outside this range was rated as unacceptable (×).

<Evaluation for Extrudability>

The pelletized electrically conductive thermoplastic elastomer compositions produced in Examples and Comparative Examples were each evaluated for extrudability based on measurement of a maximum line speed that permitted stable continuous extrusion of the electrically conductive thermoplastic elastomer composition into the tubular body having the aforementioned dimensions.

An electrically conductive thermoplastic elastomer composition that achieved stable extrusion at a line speed of not lower than 4 m/min was rated as excellent (⊚), and an electrically conductive thermoplastic elastomer composition that achieved stable extrusion at a line speed of not lower than 2 m/min but failed to achieve stable extrusion at a line speed of not lower than 4 m/min was rated as acceptable (○). An electrically conductive thermoplastic elastomer composition that failed to achieve stable extrusion even at a line speed of lower than 2 m/min was rated as unacceptable (×).

<Evaluation for Abrasion Resistance>

The driving rollers 1 produced in Examples and Comparative Examples were each incorporated in a color laser multifunction machine (Satera (registered trade name) MF8280Cw available from Canon Inc.) together with an original polyimide transfer belt. After 150000 paper sheets were successively passed through the color laser multifunction machine, a driving roller 1 having an outer diameter change of not greater than 0.03 mm was rated as acceptable (○), and a driving roller 1 having an outer diameter change of greater than 0.03 mm was rated as unacceptable (×). The evaluation was performed in the ordinary temperature and ordinary humidity environment at a temperature of 23±1° C. at a relative humidity of 55±1%.

<Measurement of Frictional Force>

The friction coefficient μ of each of the driving rollers 1 produced in Examples and Comparative Examples was measured in the ordinary temperature and ordinary humidity environment at a temperature of 23±1° C. at a relative humidity of 55±1% by the aforementioned measurement method, and the frictional force F of the driving roller 1 with respect to the belt was determined based on the friction coefficient μ thus measured.

The belt was the same transfer belt as used for the abrasion resistance evaluation.

A driving roller having a frictional force F of not less than 10 N was rated as acceptable (○), and a driving roller having a frictional force F of less than 10 N was rated as unacceptable (×).

<Measurement of Roller Resistance>

The roller resistance of each of the driving rollers 1 produced in Examples and Comparative Examples was measured in the ordinary temperature and ordinary humidity environment at a temperature of 23±1° C. at a relative humidity of 55±1% by the aforementioned measurement method.

A driving roller having a roller resistance of not greater than $10^5 \Omega$ level was rated as acceptable (○), and a driving roller having a roller resistance of greater than $10^5 \Omega$ level was rated as unacceptable (×).

<Evaluation for Dispersion State>

The driving rollers 1 produced in Examples and Comparative Examples were each evaluated for Ketjen black dispersion state based on a transmission electron microscope (TEM) photograph.

Figure 4:
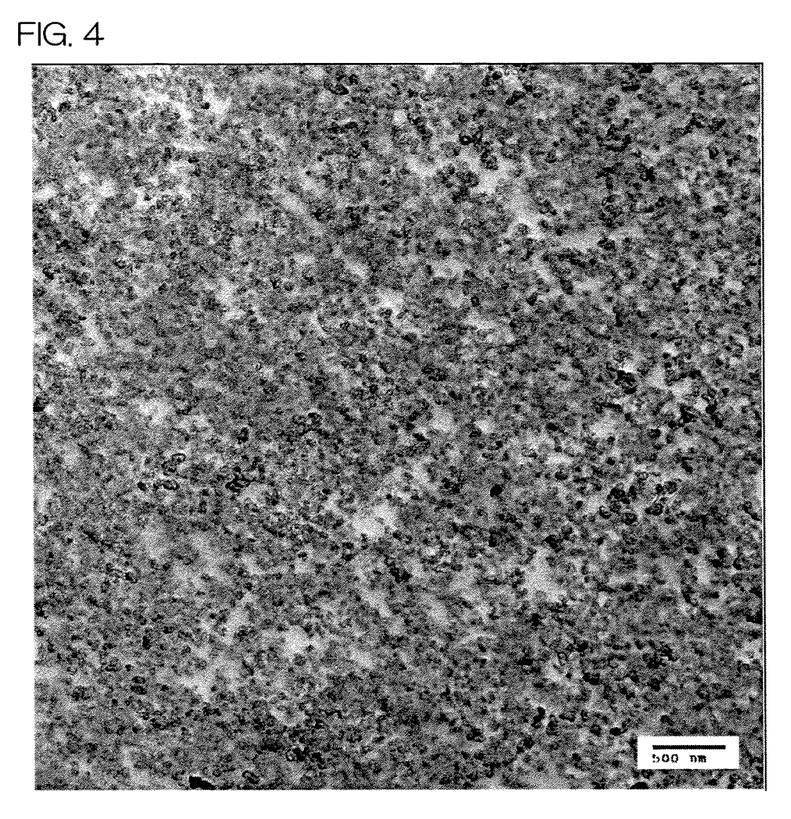
FIG. 4 is a transmission electron microscope photograph showing the dispersion state of Ketjen black in a driving roller produced in Example 3.
Figure 5:
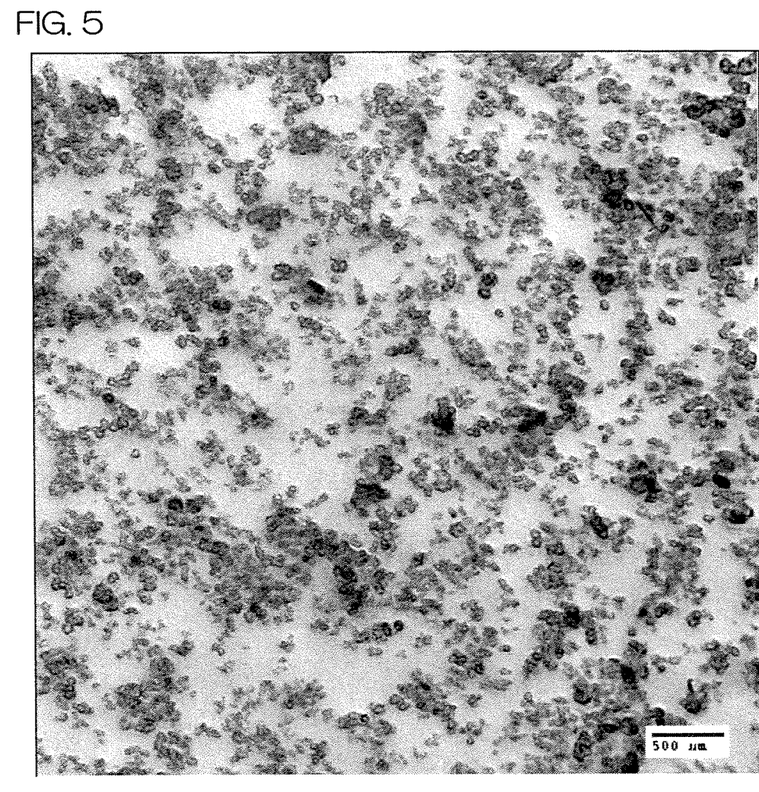
FIG. 5 is a transmission electron microscope photograph showing the dispersion state of Ketjen black in a driving roller produced in Comparative Example 3.

FIG. 4 is a TEM photograph showing the Ketjen black dispersion state of the driving roller produced in Example 3, and FIG. 5 is a TEM photograph showing the Ketjen black dispersion state of the driving roller produced in Comparative Example 3.

Comparison between the results for Example 3 (FIG. 4) and Comparative Example 3 (FIG. 5) indicates that, where the Ketjen black was later added to the elastomer from the side feeder and kneaded with the elastomer, the Ketjen black was more homogeneously and finely dispersed in the elastomer without flocculation.

A driving roller having substantially the same fine dispersion state as in FIG. 4 was rated as acceptable (○), and a driving roller having substantially the same flocculation state as in FIG. 5 was rated as unacceptable (×).

The results are shown in Tables 1 and 2.

TABLE 1

|  |  | Comparative Example 1 | Example 1 | Example 2 | Example 3 |
|---|---|---|---|---|---|
| Parts by mass | | | | | |
| Ester type urethane thermoplastic elastomer | | 80 | 80 | 80 | 80 |
| Polyester thermoplastic elastomer | 78 degrees | — | — | — | — |
|  | 88 degrees | — | — | — | — |
| Plasticizer | | 20 | 20 | 20 | 20 |
| Ketjen black | | 3 | 5 | 7 | 15 |
| Kneading step | | Two-step | Two-step | Two-step | Two-step |
| Evaluation | | | | | |
| Type-A hardness | (degree) | 67 | 69 | 70 | 75 |
|  | Rating | ○ | ○ | ○ | ○ |
| Extrudability | | ○ | ○ | ○ | ○ |
| Abrasion resistance | | ○ | ○ | ○ | ○ |
| Frictional force F | (N) | 28 | 26 | 23 | 13 |
|  | Rating | ○ | ○ | ○ | ○ |
| Roller resistance | (Ω) | $10^6$ level | $10^5$ level | $10^5$ level | $10^4$ level |
|  | Rating | × | ○ | ○ | ○ |
| Dispersion state | | ○ | ○ | ○ | ○ |

TABLE 2

|  |  | Comparative Example 2 | Comparative Example 3 | Example 4 | Comparative Example 4 |
|---|---|---|---|---|---|
| Parts by weight | | | | | |
| Ester type urethane thermoplastic elastomer | | 80 | 80 | — | — |
| Polyester thermoplastic elastomer | 78 degrees | — | — | 100 | — |
|  | 88 degrees | — | — | — | 100 |
| Plasticizer | | 20 | 20 | — | — |
| Ketjen black | | 20 | 12 | 7 | 7 |
| Kneading step | | Two-step | Single-step | Two-step | Two-step |
| Evaluation | | | | | |
| Type-A hardness | (degree) | 83 | 72 | 80 | 92 |
|  | Rating | × | ○ | ○ | × |
| Extrudability | | ○ | ○ | ⊚ | ○ |
| Abrasion resistance | | ○ | ○ | ○ | ○ |
| Frictional force F | (N) | 9 | 13 | 11 | 5 |
|  | Rating | × | ○ | ○ | × |
| Roller resistance | (Ω) | $10^3$ level | $10^7$ level | $10^5$ level | $10^5$ level |
|  | Rating | ○ | × | ○ | ○ |
| Dispersion state | | ○ | × | ○ | ○ |

The results for Comparative Example 3 in Table 2 indicate that, where the Ketjen black is kneaded together with the other ingredients by the single-step process, it is impossible to finely disperse the Ketjen black in the ingredients and hence to sufficiently reduce the resistance of the driving roller.

In contrast, the results for Examples 1 to 4 in Tables 1 and 2 indicate that, where the ingredients other than the Ketjen black are first kneaded together and then the Ketjen black is added to and further kneaded with the other ingredients by the two-step process, it is possible to finely disperse the Ketjen black in the ingredients and hence to sufficiently reduce the resistance of the driving roller.

The results for Examples 1 to 3 and Comparative Examples 1 and 2 indicate that, where the ester type urethane thermoplastic elastomer and the plasticizer are used in combination, the amount of the Ketjen black should be not less than 5 parts by mass and not greater than 15 parts by mass based on 100 parts by mass of the mixture of the ester type urethane thermoplastic elastomer and the plasticizer in order to sufficiently reduce the resistance of the driving roller while imparting the driving roller with a Durometer Type-A hardness of not lower than 60 degrees and not higher than 80 degrees and hence with sufficient frictional force.

The results for Example 4 and Comparative Example 4 indicate that, where the polyester thermoplastic elastomer is used, the amount of the Ketjen black should be not less than 5 parts by mass and not greater than 15 parts by mass based on 100 parts by mass of the polyester thermoplastic elastomer in order to provide the aforementioned effects and, particularly, the polyester thermoplastic elastomer preferably has a Durometer Type-A hardness of not lower than 60 degrees and not higher than 80 degrees in order to impart the driving roller with a Durometer Type-A hardness of not lower than 60 degrees and not higher than 80 degrees and hence with sufficient frictional force.

REFERENCE SIGNS LIST

1: Driving roller
2: Through-hole
3: Shaft
4: Outer peripheral surface
5: Aluminum drum
6: Outer peripheral surface
7: DC power source
8: Resistor
9: Measurement circuit
f: Load
V: Detection voltage
10: Center axis
11: Load meter
12: Weight
13: Belt
P: Load
W: Load
θ: Center angle

The invention claimed is:

1. An electrically conductive thermoplastic elastomer composition essentially comprising:
   an ester type urethane thermoplastic elastomer E which comprises a molecule that contains a hard segment having a polyurethane structure and a soft segment having a polyester structure;
   a plasticizer P; and
   Ketjen black finely dispersed in a mixture of the ester type urethane thermoplastic elastomer and the plasticizer, the Ketjen black being present in an amount of not less than 5 parts by mass and not greater than 15 parts by mass based on 100 parts by mass of the mixture of the ester type urethane thermoplastic elastomer and the plasticizer,
   wherein the ester type urethane thermoplastic elastomer E and the plasticizer P are present in a mass ratio E/P of E/P=70/30 to 85/15.

2. The electrically conductive thermoplastic elastomer composition according to claim 1, wherein the ester type urethane thermoplastic elastomer has a Durometer Type-A hardness of not lower than 69 degrees and not higher than 75 degrees.

3. The electrically conductive thermoplastic elastomer composition according to claim 1, wherein only the Ketjen black is present for imparting the ester type urethane thermoplastic elastomer E with electrical conductivity.

* * * * *